United States Patent

[11] 3,585,388

[72] Inventor Barton H. Laney
 Deerfield, Ill.
[21] Appl. No. 774,392
[22] Filed Nov. 8, 1968
[45] Patented June 15, 1971
[73] Assignee Nuclear-Chicago Corporation
 Des Plaines, Ill.

[54] DEAD TIME GENERATOR FOR LIQUID SCINTILLATION COUNTING SYSTEM
8 Claims, 3 Drawing Figs.
[52] U.S. Cl. .................................................. 250/71.5,
 250/83.3, 250/106, 328/116
[51] Int. Cl. .......................................................... G01t 1/20
[50] Field of Search ........................................ 250/71.5,
 106 SC, 83.3; 328/116

[56] References Cited
UNITED STATES PATENTS
3,114,835 12/1963 Packard ...................... 250/71.5

Primary Examiner—Archie R. Borchelt
Assistant Examiner—Morton J. Frome
Attorney—Lowell C. Bergstedt ABSTRACT: A combined coincidence and dead time signal generator incorporated in a liquid scintillation counting system employing pulse height analysis. Coincidence amplifiers are constructed to have dead time at least as great as that of pulse height analysis channels at any setting. Dead time of coincidence amplifiers is detected and signaled by an arrangement of logic and timing circuits. The dead time signal controls a timing circuit and coincidence function to provide live time operation of system.

DEAD TIME GENERATOR FOR LIQUID SCINTILLATION COUNTING SYSTEM

The counting of liquid scintillation samples involves the detection of scintillations produced in a transparent vial containing a liquid scintillator by one or more radioisotopes such as tritium (H-3), carbon-14 (C14) and phosphorous-32 (P-32). The energies of radioactive emissions from these various radioisotopes vary from the relatively low energy beta emissions of tritium to the high energy beta emissions of P-32. A liquid scintillation counting system typically includes one or more pulse height analysis channels which can be programmed for counting of scintillations occurring within various ranges of the spectrum of scintillation energies produced by the various radioisotopes. Since pulse height analysis is accomplished on a one pulse at a time basis and a certain amount of time is required for analysis of a pulse, an analysis channel has a certain amount of dead time associated with each analyzed pulse. Pulses which arrive at the input of an analysis channel during a dead time interval will be either not analyzed at all or incorrectly analyzed. If the sample being counted has a high activity so that a large number of pulses are produced in short periods of time, the number of pulses occurring during dead time intervals will be significant and error will be introduced into a determination of the number of pulses occurring during an indicated lapsed counting time.

If a liquid scintillation counting system is programmed for counting a low energy sample in the presence of high energy pulses from a second radioisotope in a dual sample or from an external standard source during a sample standardizing period, a large amount of dead time will usually be produced in the analysis channel for the low energy scintillations. This is primarily due to the overloading of amplifiers in the low energy channel by large amplitude pulses. If the low energy sample has a relatively high activity, a large error is introduced into the determination of counts per elapsed time unless the dead time of the analysis channel is compensated for. As a general principle, it can be stated that any high activity sample will be counted with some degree of inaccuracy on a strictly lapsed time basis unless the dead time of the analysis channel is taken into consideration. These inaccuracies are magnified in counting low energy samples in the presence of high amplitude pulses which produce a large amount of dead time in the analysis channel which is programmed for counting low energy scintillations. Some means for extending the actual counting interval to compensate for the amount of dead time actually produced in the analysis channel would eliminate the inaccuracies otherwise inherent in the counting of high activity samples.

Therefore, it is the principal object of this invention to provide an improved liquid scintillation counting system.

It is a further object of this invention to provide a liquid scintillation counting system including a dead time generator for correcting the counting interval of the system in accordance with dead time produced therein.

In accordance with a preferred embodiment of this invention a combined coincidence and dead time circuit is provided in a liquid scintillation counting system for producing both an indication of coincidence events occurring at the output of photomultiplier tubes viewing the sample and to generate a dead time signal for each analyzed pulse with the length of the dead time signal being at least as great as the length of the actual dead time produced in the pulse height analysis channel. The coincidence and dead time circuit includes a pair of coincidence amplifiers which are constructed to produce a combined dead time in response to input pulses from the photomultiplier tubes which is at least as great as the longest possible dead time produced by combined pulses in the pulse height analysis channel at any setting thereof. The dead time produced in the coincidence amplifiers is detected by an arrangement of logic and timing circuit elements coupled to the outputs of coincidence amplifiers. Dead time signals of various preselected lengths are generated for each single pulse and each set of coincident pulses provided that no overload of the coincidence amplifiers is involved. Overloading of the coincident amplifiers is separately detected and a dead time signal is produced of a length at least as great as the period of time that the amplifiers remain in an overload condition. The dead time signal generated may be used in various ways to alter the indication of lapsed time produced by a timing circuit so that the indicated elapsed time will substantially equal the actual lapsed time minus the sum of the lengths of the various dead time signals generated. Preferably, the elapsed time correction is performed on a continuous basis so that system operation in a preset count or preset time mode can readily be achieved.

The combined coincidence and dead time circuit also is arranged to produce a delayed coincidence signal for gating properly analyzed pulses representing coincident events from the pair of photomultiplier tubes into appropriate scaling or counting circuitry. In accordance with this invention a particularly advantageous combination of dead time generating circuitry and coincident detecting circuitry is provided, involving the use of a minimum of circuit elements to accomplish the desirable function of generating a dead time signal which is at least as long as the actual system dead time produced during pulse height analysis. In addition, this invention features an arrangement in which the overall counting system is actually forced into a dead time interval for the total length of each dead time signal generated. This is accomplished by inhibiting the operation of coincident event indicating portions of the combined coincidence and dead time circuit during the length of the generated dead time signal. In this manner, it is ensured that pulses are counted only during the actual live time conditions of the system and that the elapsed time indication given by timing circuitry corrected in accordance with the dead time signals generated represents the actual live time of the counting system.

The principal advantage inherent in the combined coincidence and dead time circuit provided in accordance with this invention is the elimination of inaccuracies in the indications of counts per elapsed time produced in a liquid scintillation counting system. Other objects, features and advantages of this invention will be apparent from a consideration of the following detailed description in conjunction with the accompanying drawings in which.

Figure 1:
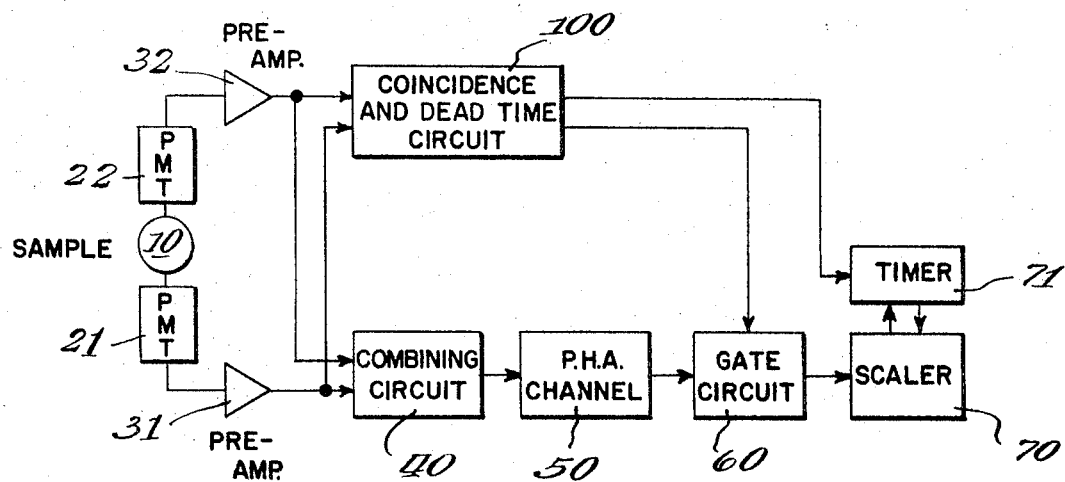
FIG. 1 is a block schematic diagram of a liquid scintillation counting system incorporating a coincidence and dead time circuit in accordance with this invention.

With reference to FIG. 1, a typical liquid scintillation counting system includes a pair of photomultiplier tubes 21 and 22 viewing a liquid scintillation sample 10. Sample 10 is generally a vial of light transmissive material containing a liquid scintillating medium and at least one radioactive isotope. Scintillations produced in sample 10 are transduced by photomultiplier tubes 21 and 22 into output pulses having amplitudes proportional to the energy of the scintillation producing event. Photomultiplier tubes 21 and 22 are powered by a high voltage supply (not shown). A scintillation in sample 10 will produce a pair of coincident output pulses whereas noise pulses in the photomultiplier tubes 21 and 22 will generally be single output events occurring in anticoincidence with output events from the other of the photomultiplier tubes.

Output pulses from photomultiplier tubes 21 and 22 are separately amplified by preamplifiers 31 and 32, respectively. The outputs of preamplifiers 31 and 33 are fed to a combining circuit 40 which operates to produce output pulses typically representing the sum of separate input pulses from preamplifiers 31 and 32. Other modes of combining pulses originating in the photomultiplier tubes into a pulse train suitable for pulse height analysis could be employed. The output of combining circuit 40 is fed to a pulse height analysis (P.H.A.) channel 50. Channel 50 produces an output indication for each input pulse from summing circuit 40 having an amplitude within the range of amplitudes for which channel 50 is set. Typically, channel 50 will be a variable or programable channel capable of being set to indicate the receipt of pulses in a preselected range of the pulse amplitude spectrum corresponding to a spectrum of scintillation intensities in sample 10. The output of channel 50 resulting from an input pulse within its programmed range may be a single pulse of a particular fixed height or a set of logic levels indicative of a first logic state, whereas input pulses outside the range of the channel 50 would produce, respectively, either an absence of a pulse or a set of logic levels indicative of a second logic state. Output indications from channel 50 are received by gate circuit 60 which functions to transmit a pulse to scaler 70 upon receipt of an output indication from pulse height analysis channel 50 in coincidence with a coincidence signal from coincidence and dead time circuit 100. Scaler 70 functions to count a number of output pulses from gate circuit 60 in either a binary or decimal fashion.

Timer 71 may be functionally related to scaler 70 for operation of the system in a preset-time mode, in which scaler 70 would count received pulses for a period of time selected by the setting of timer 71, or in a preset-count mode, wherein timer 71 would operate to give the lapsed time required for scaler 70 to count a preselected number of input events. Timer 71 receives dead time signals from coincidence and dead time circuit 100 and functions to indicate live system time which is substantially equivalent to the total elapsed time less the sum of the lengths of dead time signals received from coincidence and dead time circuit 100. Various modes of operation of timer 71 would suggest themselves to one skilled in the art. For example, the operation of timer 71 could involve the employment of a clock pulse generator in conjunction with circuitry for strobing the dead time input signal and cancelling either the immediate clock pulse or the next subsequent clock pulse each time a strobing by the clock coincides with the presence of a dead time signal thereon. Proceeding in this fashion results in a less expensive timing circuit since a high frequency clock pulse generator which would turn ON and OFF under the control of the dead time signal need not be employed. It can be shown that, on a statistical basis, accuracy in obtaining a live time indication is achieved within acceptable 51 by this strobing method, provided that various parameters are appropriately chosen.

Coincidence and dead time circuit 100 receives input pulses from preamplifiers 31 and 32 and operates to produce a coincidence signal for transmittal to gate circuit 60 upon receipt of coincident pulses corresponding to a combined pulse actually analyzed by channel 50 and to produce a dead time signal for each analyzed pulse, such dead time signal having a length at least as great as the dead time actually produced in channel 50 by the corresponding analyzed pulse. Utilization of these coincidence and dead time signals by gate circuit 60 and timer 71 respectively has already been described above. It should be understood that combining circuit 40 could feed a number of pulse height analysis channels each having an associated separate gate circuit and scaler or else connectable in a switchable fashion to gate circuit 60 and scaler 70. Moreover, it should be understood that coincidence and dead time circuit 100 could provide a coincidence output signal for other gate circuits associated with other channels in parallel with channel 50 and gate circuit 60. Finally, timer 71 could function in association with additional scalers similar to scaler 70 in either a preset-time mode or on the basis of a preset count from a selected scaler.

In general, the operation of FIG. 1 can be described as follows. Scintillations occurring in sample 10 will result in coincident output pulses from preamplifiers 31 and 32. Separate output pulse trains from preamplifiers 31 and 32 are combined in circuit 40 into a single pulse train for pulse height analysis purposes. The output of combining circuit 40 is a pulse train which includes pulses corresponding to coincident output pulses from preamplifiers 31 and 32 and single output pulses from individual preamplifiers resulting from noise pulses in photomultiplier tubes 21 and 22. Pulse height analysis channel 50 will analyze the first input pulse received from combining circuit 40 and provide an output indication if the input pulse received lies within the preselected range of channel 50. During analysis of this pulse, channel 50 is in a dead time interval which lasts for a period of time depending upon the characteristics of the input pulse and subsequently arriving pulses which cannot be correctly analyzed. For each pulse analyzed in channel 50, coincidence and dead time circuit 100 will provide an indication of the coincident or noncoincident origin of the analyzed pulse at the proper time to gate circuit 60 and simultaneously generate a dead time signal of a length which depends upon the characteristics of the analyzed pulse and subsequently arriving unanalyzed pulses. Pulse height analysis channel 50 will produce an output indication to gate circuit 60 if the analyzed pulse is within range, and gate circuit 60 will then produce an output pulse to scaler 70 if it receives a coincidence indication from coincidence and dead time circuit 100. The dead time signal fed to timer 71 will correct the elapsed time indication given by timer 71 in accordance with the length of the generated dead time signal. It should be understood, however, that if the dead time signal correction of the timer is accomplished on a strobing or sampling basis, actual correction of the elapsed time during the length of a particular dead time signal may not occur if a strobing signal happens not to occur coincident with the dead time signal. On the average, however, timer 71 will be properly controlled by the dead time signals generated by coincidence and dead time circuit 100. In a preferred embodiment of this invention, a self-inhibiting feature is included in coincidence and dead time circuit 100 so that no coincidence indication can be provided to gate circuit 60 during the presence of a dead time signal indication to timer 71. In this manner a precise live time control of the counting of analyzed pulses by scaler 70 is achieved so that it can be assured that an actual live time counting period is achieved during the operation of the system.

Figure 2:
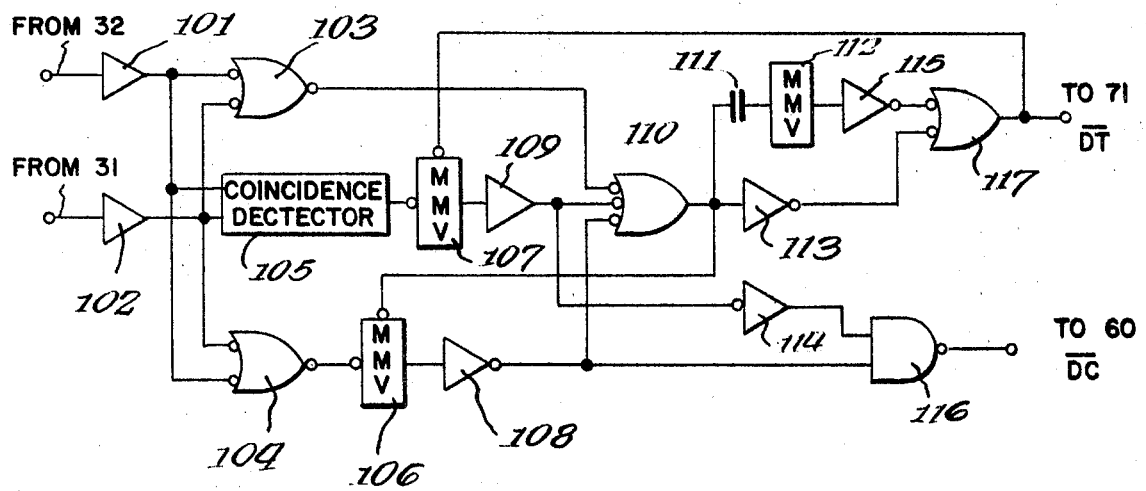
FIG. 2 is a schematic diagram of a preferred embodiment of a coincidence and dead time circuit in accordance with this invention.

Referring now to FIG. 2, the construction of a particular coincidence and dead time circuit will be described. Coincidence amplifiers 101 and 102 receive pulses from preamplifiers 31 and 32 and are constructed such that they will overload and provide a dead time indication at their output for a length of time at least as great as associated overload dead time in channel 50 at any setting thereof. Typically, a high amplitude pulse associated with a high energy scintillation in sample 10 or a large amplitude noise pulse from a photomultiplier tube will overload amplifiers in a pulse height analysis channel which is set to indicate pulses in a range of amplitudes at a low end of the spectrum. Therefore, coincidence amplifiers 101 and 102 are constructed so that they will overload upon receipt of pulses corresponding to similar events in sample 10 or one of the photomultiplier tubes and produce a dead time indication at their output lasting at least as long as associated dead time in channel 50 at its lowest possible setting. The outputs of coincidence amplifiers 101 and 102 are coupled to OR-gate 103, OR-gate 104 and coincidence detector 105. OR-gate 103 has inverted inputs and an inverted output whereas OR-gate 104 and coincidence detector 105 each have only an inverted output. The output of OR-gate 103 provides an input to OR-gate 110. The output of OR-gate 104 provides an input to MMV (monostable multivibrator) 106. The output of MMV 106 is coupled through inverting amplifier 108 to an inverted input or OR-gate 110 and as inhibit input to AND-gate 116. The output of coincidence detector 105 is coupled to an input of MMV 107. The output of MMV 107 is coupled through inverting amplifier 109 as an inverted input to OR-gate 110 and through a second inverting amplifier 114 as an input to AND-gate 116. The output of OR-gate 110 is coupled through inverting amplifier 113 to an inverted input on OR-gate 117 and through a capacitor 111 as an input to MMV 112. In addition, the output of OR-gate 110 is coupled as an inhibit input to MMV 106. The output of MMV 112 is coupled through an inverting amplifier 115 as an inverted input to OR-gate 117. The output on AND-gate 116 is a delayed coincidence signal which is fed to gate circuit 60. The output of OR-gate 117 is a dead time signal and provides an inhibit input to MMV 107. The inhibit inputs to MMVs 106 and 107 do not provide a turning OFF, but rather a preventing of subsequent starting.

The operation of the circuitry shown in FIG. 2 can generally be described as follows. An input pulse to either or both coincidence amplifiers 101 produces a positive going amplified output pulse on one or both outputs to turn ON OR-gate 104. OR-gate 104, in turn, turns ON MMV 106 which, in turn, turns ON OR-gate 110 and inhibits AND-gate 116. MMV 106 has a preselected operating time constant and will turn itself OFF after a preselected time interval. OR-gate 110 turns ON OR-gate 117 which provides a dead time signal for at least the duration of the operating interval of MMV 106. Each time a positive pulse occurs at the output of either of coincidence amplifiers 101 and 102, MMV 106 will be turned ON unless it is inhibited by the output signal from OR-gate 110.

If an overloading pulse is received by either of the coincidence amplifiers 101 and 102 an initially positive going output signal will be produced followed by a negative output signal for the duration of the overload. A negative output signal from either of coincidence amplifiers 101 and 102 turns ON OR-gate 103 for the duration of the negative output signal. OR-gate 103 will keep OR-gate 110 ON during the duration of the negative signal produced as a result of the overload. MMV 106 will not start during the overload period and a dead time signal at the output of OR-gate 117 will exist throughout the duration of the overload.

If coincident positive output signals exist at the outputs of coincidence amplifiers 101 and 102, coincidence detector 105 will turn ON and its output will, in turn, turn ON MMV 107 unless MMV 107 is inhibited from operation by a previously generated dead time signal on the output of OR-gate 117. MMV 107 has a fixed time constant so that it turns itself OFF after a preselected time interval. The output of MMV 107 during this period maintains OR-gate 110 in an ON condition.

In order to produce a delayed coincidence signal at the output of AND-gate 116, MMV 106 is constructed to have a shorter time constant than MMV 107, so that after MMV 106 turns OFF, AND-gate 116 will be turned ON by the output from MMV 107 if MMV 107 is in an ON condition due to the detection of coincident input events. The operation of AND-gate 116 will continue for the portion of the operating period of MMV 107 subsequent to the turning OFF of MMV 106. The amount of the delay of the coincidence signal is selected in accordance with the analysis time required by channel 50.

OR-gate 110 is always operated initially by the turning ON of MMV 106 and it remains ON during any overload detected by OR-gate 103 or during the operation of MMV 107. When OR-gate 110 turns OFF at the end of a dead time interval, MMV 112 is turned ON for a reset interval, and its output keeps OR-gate 117 ON for the duration of the reset interval. The length of the reset interval is selected in accordance with the requirements of the pulse height analysis circuitry and is provided to ensure that channel 50 and any other channels are ready to analyze another input pulse. A dead time signal is thus generated for the total length of the operation of OR-gate 110 plus the length of the operating period of MMV 112. Because of the construction of coincidence amplifiers 101 and 102 as well as the fixed time constant provided for MMV 106 and MMV 107, the dead time signal will always be at least as long as the actual dead time in channel 50 or other channels at any setting thereof. The dead time signal can be used as described above or in other fashions to control the lapsed time indication given by timer 71.

Figure 3:
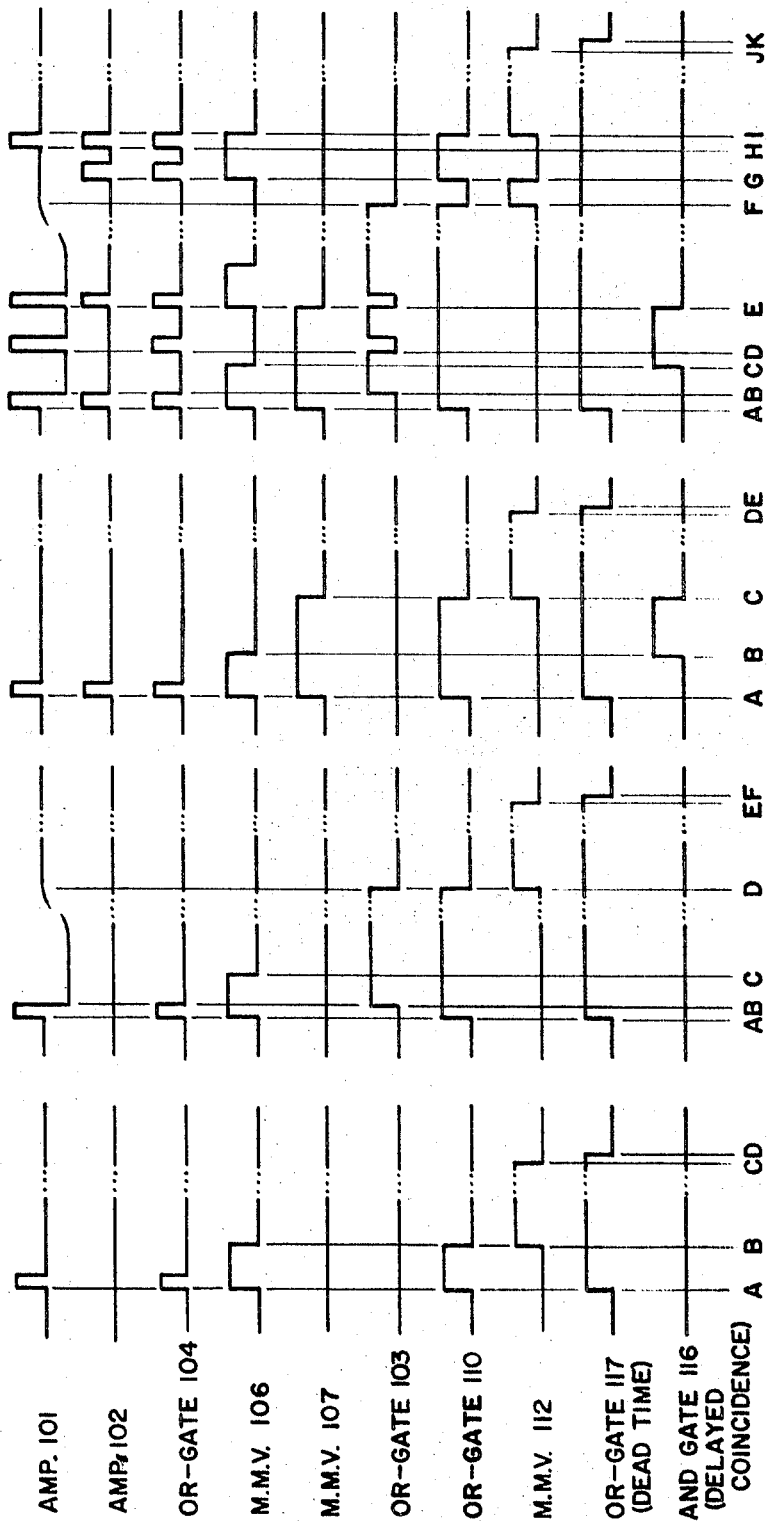
FIG. 3 is a pulse and operation diagram useful in describing the operation of the circuitry shown in FIG. 2.

In FIG. 3 a series of pulse and operating charts are provided. No attempt is made to reproduce accurately the actual shape of physical signals, but rather to illustrate the operation of the various devices shown in FIG. 2 under various input pulse conditions. The first event shown is a nonoverloading single event. Thus, a single output pulse from coincidence amplifier 101 is shown at time A with no output from coincidence amplifier 102. The output from amplifier 101 turns ON OR-gate 104 which, in turn, turns ON MMV 106. MMV 106 turns ON OR-gate 110, and OR-gate 110 remains ON for the duration of the operation of MMV 106. OR-gate 117 is turned ON by OR-gate 110 at time A, and MMV 112 is turned on at time B by the turning OFF of OR-gate 110. Consequently, MMV 112 maintains OR-gate 117 in an ON condition for the duration of its operation. OR-gate 117 turns OFF a short time after MMV 112 turns OFF due to a built-in delay in the input circuitry of OR-gate 117. It will be noted that MMV 107 did not operate because the input was a single event rather than a coincident event, and OR-gate 103 did not operate because the event was nonoverloading. AND-gate 116 also did not operate during this time because the event was a single event.

The second event on the diagram in FIG. 3 is an overloading single event occurring at time A. The event is detected at time A by OR-gate 104 which turns ON MMV 106 and, at the same time, OR-gate 110 and OR-gate 117 are turned ON. When the overload occurs at time B and the output of amplifier 101 becomes negative, OR-gate 103 detects the overload and turns ON. Thus when MMV 106 turns OFF at time C, OR-gate 110 and OR-gate 117 remain ON because of the continued operation of OR-gate 103. At time D the overload of amplifier 101 is ended so OR-gate 103 turns OFF, and OR-gate 110 also turns OFF, thereby turning ON MMV 112 to hold OR-gate 117 ON for the reset interval. At time E, MMV 112 turns OFF, and after a slight delay, OR-gate 117 turns OFF ending the dead time signal. MMV 107 did not operate during this period because it was a single event. Consequently AND-gate 116 remained OFF during the entire sequence.

The next event to come along in FIG. 3 is a nonoverloading coincident event. At time A, output pulse events occur on both amplifiers 101 and 102 so that OR-gate 104, MMV 106, MMV 107, OR-gate 110 and OR-gate 117 are all turned ON. MMV 107 turns ON because coincidence detector 105 detects the presence of coincidence event from amplifiers 101 and 102. At time B, MMV 106 turns OFF, but MMV 107 remains ON so that OR-gate 110 and OR-gate 117 are held in an ON condition. At time B, AND-gate 116 turns ON because MMV 107 is ON and MMV 106 is OFF. At time C, MMV 107 turns OFF which, in turn, turns OFF OR-gate 110 and AND-gate 116. MMV 112 turns ON at this time, maintaining OR-gate 117 in an ON condition. At time D, MMV 112 turns OFF and a short time later, at time E, OR-gate 117 turns OFF, ending the dead time interval.

The next event in FIG. 3 comprises an overloading coincident event with after-pulsing. At this point, it should be noted that after-pulsing could occur in conjunction with any of the other events previously described and it should be apparent from the description given below how the circuitry would handle such after-pulsing. At time A a coincidence events occur at the outputs of amplifiers 101 and 102. OR-gate 104 detects the occurrence of an event and MMV 107 is turned ON by coincidence detector 105 detecting the coincident nature of the events. Of course, MMV 106, OR-gate 110 and OR-gate 117 are also turned ON at this time. At time B, an overload is detected by OR-gate 103, and MMV 107 is in an ON condition so both MMV 107 and OR-gate 103 maintain OR-gate 110 in an ON condition. At time C, when a single after-pulse occurs OR-gate 104 detects this event but MMV 106 does not turn ON because of the signal on its inhibit lead from OR-gate 110. OR-gate 103 turns OFF during the pulse but it turns back ON again thereafter. Going back to time C it should be noted that AND-gate 116 turns ON to give a delayed coincidence signal because MMV 106 is turned OFF and MMV 107 remained ON. At time E a coincident after-pulse event occurs which is detected by OR-gate 104 but MMV 107 remains OFF because it is inhibited from starting by the feedback of the output from OR-gate 117 which has remained ON. OR-gate 110 may have a tendency to turn OFF at time E, but if it turns OFF briefly, it turns ON again due to the operation of MMV 106. Consequently, OR-gate 117 remains ON at time E although AND-gate 116 turns OFF with the turning OFF of MMV 107. At time F the overload ends so that OR-gate 110 turns OFF, but MMV 112 turns ON to maintain OR-gate 117 in an ON condition. The after-pulse occuring at time G is detected by OR-gate 104 which turns ON MMV 106 and reoperates OR-gate 110. When OR-gate 110 turns back ON, MMV 112 turns OFF but, of course, OR-gate 117 remains ON To continue the dead time signal. At time H a coincident after-pulse occurs which is detected by OR-gate 104. MMV 107 does not turn on because it is inhibited by the dead time signal output from OR-gate 117. At time I, MMV 106 turns OFF which turns OFF OR-gate 110. MMV 112 is turned ON for the reset interval until time J when MMV 112 turns OFF. At time K OR-gate 117 turns OFF ending the dead time signal.

It should be emphasized that the coincident after-pulse event did not produce a delayed coincidence signal because MMV 107 was inhibited during the total dead time signal generated at the output of OR-gate 117. This prevented false signaling of gate circuit 60 during the dead time interval. From this it can be seen that the system is forced to remain in a dead time interval throughout the total length of the dead time signal generated by the circuitry shown in FIG. 2. Thus, the system only measures or analyzes pulses during actual live time conditions and this is ensured by the advantageous construction of the combined coincidence and dead time circuit shown in FIG. 2. Efficient utilization of circuit elements is accomplished by utilizing the selected timing interval variance between MMV 106 and MMV 107 to provide the delayed coincidence output at AND-gate 116 when MMV 106 turns OFF and MMV 107 remains ON.

As indicated above, the reset portion of the dead time interval generated by MMV 112 ensures that the length of the dead time signal is long enough to preclude the possibility of signaling coincidence to gate circuit 60 before dead time conditions in pulse height analyzer channel 50 have disappeared. In other words, the system is forced to remain dead until it is sure that channel 50 is ready to analyze the next pulse to come along. OR-gates 103 and 104 will detect all positive and negative signal excursions at the outputs of coincidence amplifiers 101 and 102 which indicate a dead time condition including base line drifts.

It should be understood, of course, that various other configurations of logic and timing circuit elements other than those shown in FIG. 2 could be employed to accomplish the same overall result of generating delayed coincidence and dead time signals. Selection of the particular timing intervals involved in the operation of MMV 106, MMV 107 and MMV 112 is made on the basis of the system requirements, particularly the requirements of the pulse height analysis channel or channels.

It should be understood that the above description of a preferred embodiment of this invention is merely exemplary and that numerous modifications could be made without departing from the scope of this invention as I claim in the following claims:

1. In a system for counting a liquid scintillation sample,
scintillation detecting means, including a pair of photoresponsive elements, for producing a coincident pair of output pulses in response to each scintillation in said sample as well as intermittent, normally anticoincident parasitic output pulses;
combining circuit means for combining said output pulses into a pulse train suitable for pulse height analysis;
at least one pulse height analysis channel receiving said pulse train operative to produce an output indication for each analyzed pulse having an amplitude within a preselected range, said channel having a dead time period associated with each analyzed pulse during which subsequently occurring pulses therein will not be analyzed, the length of said period varying with said preselected range and the characteristics of said analyzed pulse and unanalyzed pulses;
control circuit means coupled to said scintillation detecting means operative to produce a coincidence signal associated with each said analyzed pulse corresponding to a coincident pair of output pulses and to produce a dead time signal associated with each and every analyzed pulse, the length of said dead time signal varying with the characteristics of output pulses associated with said analyzed pulse and its associated unanalyzed pulses and being at least as great as said dead time period of said channel;
gating circuit means operative to produce an output pulse upon coincidence of an output indication from said channel and a coincidence signal from said control circuit means;
counting circuit means operative to count said output pulses from said gating circuit means during a counting period; and
timing circuit means operative to define a live time period substantially equivalent to the duration of said counting period less the sum of the lengths of said dead time signals.

2. Apparatus as claimed in claim 1, wherein said control circuit means includes
first and second amplifying means for separately amplifying output pulses originating from said pair of photoresponsive elements, said amplifying means being constructed such that they have a combined dead time period due to overloading input pulses of a length substantially equivalent to the longest possible dead time period produced by an associated pulse in said channel in any preselected range;
event detecting means operative in response to an amplified output pulse from one of said amplifying means to produce an event signal having a preselected first duration;
overload detecting means operative to detect an overloading dead time condition in one of said amplifying means and to produce an overload signal during said detected dead time condition;
coincidence detecting means operative in response to coincident amplified output pulses to produce a coincident event signal having a preselected second duration;
dead time detecting means operative in response to any of said event, overload, or coincident event signals to produce a dead time detection signal during the combined duration of said signals; and
means for producing said coincidence signal during at least a portion of said coincident event signal.

3. Apparatus as claimed in claim 2, wherein said control circuit means further includes
dead time signal means operative in response to said dead time detection signal to produce as said dead time signal an output pulse of a duration equal to the duration of said dead time detection signal plus a preselected reset interval;
first inhibit means for inhibiting a subsequent operation of said event detecting means during said dead time detection signal; and
second inhibit means for inhibiting a subsequent operation of said coincidence detecting means during said dead time signal.

4. Apparatus as claimed in claim 2, wherein said preselected second duration of said coincident event signal is greater than said preselected first duration of said event signal; and said means for producing said coincidence signal comprises anticoincidence circuit means receiving said coincident event signal and said event signal operative to produce said coincidence signal only during the interval when said coincident event signal appears in anticoincidence with said event signal.

5. Apparatus as claimed in claim 1, wherein said control circuit means includes first and second coincidence amplifiers for separately amplifying output pulses originating from said pair of photoresponsive elements, said amplifiers being constructed such that at least one of said amplifiers will overload in response to an overloading input pulse and have a dead time period of a length substantially equivalent to the longest possible dead time period produced by an associated pulse in said channel in any preselected range, each of said amplifiers having an output at a reference level when in a live condition, an output of one polarity with respect to reference when in a dead condition due to a nonoverloading input signal, and an output of opposite polarity when in a dead condition due to an overloading input signal, an event detecting circuit including a first OR-gate coupled to said outputs of said coincidence amplifiers and a first monostable circuit coupled to said first OR-gate, said first OR-gate being turned ON by a one polarity output from one of said coincidence amplifiers and said first monostable circuit being turned ON by said first OR-gate to produce an event signal of a first duration;

an overload detecting circuit including a second OR-gate coupled to said outputs of said coincidence amplifiers, said second OR-gate being turned ON for substantially the duration of an opposite polarity output from one of said coincidence amplifiers to produce an overload signal of said duration;

a coincidence detecting circuit including a coincidence detector coupled to said outputs of said coincidence amplifiers and a second monostable circuit coupled to the output of said coincidence detector, said coincidence detector being turned ON by substantially coincident one polarity outputs from said coincidence amplifiers and said second monostable circuit being turned ON by said coincidence detector to produce a coincident event signal of a second duration;

a dead time detecting circuit including a third OR-gate coupled individually to said first monostable circuit, said second OR-gate, and said second monostable circuit, said OR-gate being turned ON by one of said events, overload, and coincident event signals, and remaining ON for the combined duration of said signals to produce a dead time detection signal of said combined duration.

6. Apparatus as claimed in claim 5, wherein said control circuit means further includes a reset signal circuit including a third monostable circuit coupled to the output of said third OR-gate, said third monostable circuit, being turned ON by the turning OFF of said third OR-gate and being turned OFF by the turning ON of said third OR-gate, said third monostable circuit producing a reset signal of a third duration after every final turning OFF of said third OR-gate; and a dead time signal generator including a fourth OR-gate coupled to said third OR-gate and said third monostable circuit, said fourth OR-gate being turned ON by said dead time detection signal and remaining ON for the combined duration of said dead time detection signal and said reset signal to produce a dead time signal of said combined duration.

7. Apparatus as claimed in claim 6, wherein said control circuit means further includes a first inhibit circuit connection from said third OR-gate to said first monostable circuit to prevent the turning ON of said first monostable circuit for the duration of said dead time detection signal; and a second inhibit circuit connection from said fourth OR-gate to said second monostable circuit to prevent the turning ON of said second monostable circuit for the duration of said dead time signal.

8. Apparatus as claimed in claim 5, wherein said first duration of said event signal is less than said second duration of said coincident event signal; and said control circuit means further includes a coincidence signal generator including an AND-gate coupled to said first and second monostable circuits, said AND-gate being turned ON by said coincident event signal when said first monostable circuit turns OFF to produce a coincidence signal for the remainder of the duration of said coincident event signal.